H. A. HARRIS.
Load-Binder.

No. 210,527. Patented Dec. 3, 1878.

WITNESSES:
W. W. Hollingsworth
Solon C. Kemon

INVENTOR:
H. A. Harris
BY
ATTORNEYS.

UNITED STATES PATENT OFFICE.

HENRY A. HARRIS, OF KATONAH, NEW YORK.

IMPROVEMENT IN LOAD-BINDERS.

Specification forming part of Letters Patent No. 210,527, dated December 3, 1878; application filed February 22, 1877.

*To all whom it may concern:*

Be it known that I, HENRY A. HARRIS, of Katonah, in the county of Westchester and State of New York, have invented a new and Improved Apparatus for Binding Hay and Grain; and I do hereby declare that the following is a full, clear, and exact description of the same.

My invention has for its object to provide a simple and conveniently operated apparatus as a substitute for the pole and chains ordinarily employed for binding hay, straw, cut grain, or bales, bundles, &c., upon a rack or wagon-body.

The apparatus is composed of ropes and a catch pulley-block, constructed and arranged as shown in accompanying drawing, in which—

Figure 1:
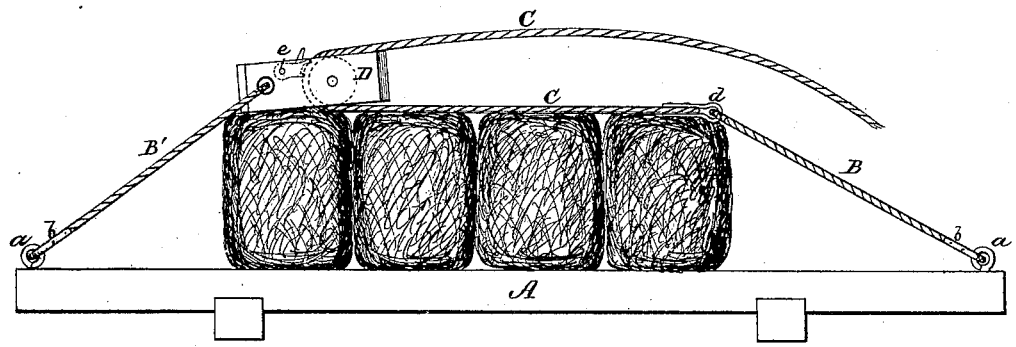
Figure 2:
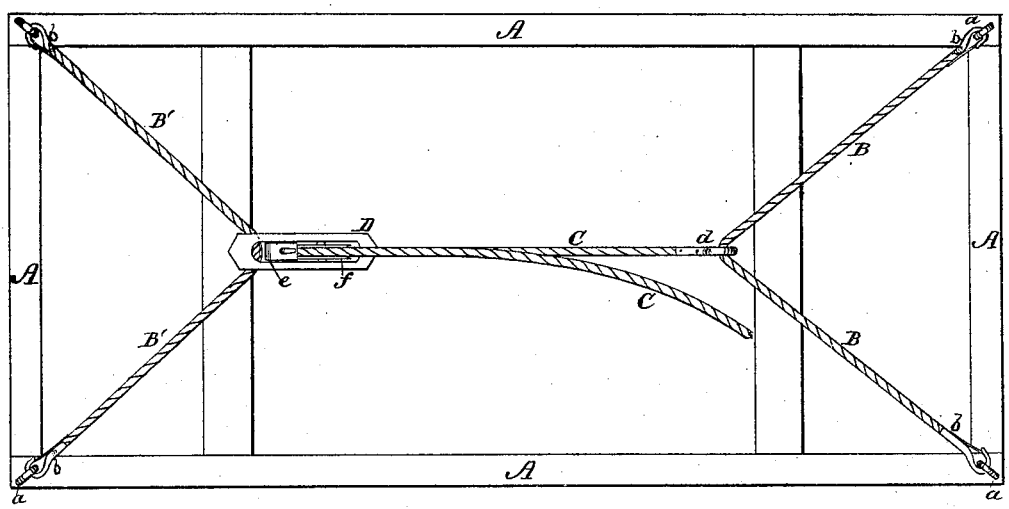
Figure 3:
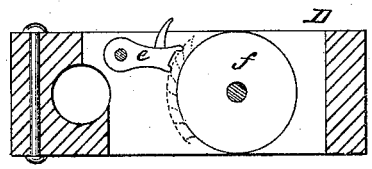

Figure 1 is a side view of a wagon-rack supporting a number of bales of hay, and having my improved binding apparatus attached thereto. Fig. 2 is a plan view. Fig. 3 is a longitudinal section of the catch pulley-block.

A indicates the rack or wagon-body. The same is provided with a ring or screw-eye, $a$, at each corner. Slack ropes B B' are attached to said rings, one at each end of the rack, by means of snap-hooks $b$, which are strongly secured to the respective rope ends.

A third rope, C, connects the slack rope B permanently with a clamp or catch pulley-block, D, said rope B passing loosely through a metal eye, $d$, to which the rope C is attached.

A dog, $e$, is pivoted in the slot of the block D, so as to bite the rope and prevent it being drawn through the block when subjected to traction. The block is provided with a pulley, $f$, to enable the rope C to be easily drawn through it when the dog $e$ is thrown back, and the bite is between the latter and said pulley, as shown clearly in Fig. 3.

The dog $e$ is provided with prongs or forks on its outer end, which, when the dog is pressed into the slot in the block, engage with the strands of the rope C, and prevent the dog becoming easily or accidentally displaced.

The apparatus is attached to the rack by hooking the snaps $b$ into the rings $a$. When the hay, straw, or grain has been placed on the rack, the ropes B B' are drawn up over the ends of the load, and the top binding-rope, C, (which is on the forward end,) is then passed through the pulley-block and drawn taut, and the dog $e$ simultaneously thrown down, so as to clamp said rope C, and thereby hold the load tightly bound upon the rack. To remove the binding apparatus, the dog is raised to release the top rope, C, and the latter drawn out of the block.

The operation of binding and unbinding a load may thus be very easily and quickly performed, and the load is also held more securely than by the pole and chains heretofore used. The apparatus is likewise very light, compact, and cheap.

What I claim is—

1. The improved hay-binding apparatus, consisting of the slack ropes, catch pulley-block, and top connecting-rope, C, as shown and described.

2. The combination of the slack ropes, having snap-hooks attached, the ropes C, and the pulley-block, having a pivoted dog, with the hay-rack having rings at its corners, as shown and described, for the purpose specified.

HENRY ALLEN HARRIS.

Witnesses:
 C. E. TRAVIS,
 BERNARD TRAVIS.